United States Patent
Cech et al.

(10) Patent No.: US 6,354,888 B1
(45) Date of Patent: Mar. 12, 2002

(54) SECURING SYSTEM FOR DIFFERENT TYPES OF PLUG CONNECTOR

(75) Inventors: Markus Cech, Ostfildern; Frank Andrä, Deizisau, both of (DE)

(73) Assignee: Gerag AG (DE)

( * ) Notice: Subject to any disclaimer, the term of this patent is extended or adjusted under 35 U.S.C. 154(b) by 0 days.

(21) Appl. No.: 09/570,255

(22) Filed: May 12, 2000

(30) Foreign Application Priority Data

May 12, 1999 (DE) .................................... 299 08 490 U

(51) Int. Cl.[7] ................................................ H01R 9/26
(52) U.S. Cl. ..................... 439/716; 439/540.1; 439/532
(58) Field of Search ......................... 439/92, 532, 716, 439/368; 200/294, 296

(56) References Cited

U.S. PATENT DOCUMENTS

| | | | |
|---|---|---|---|
| 3,858,158 A | * 12/1974 | Henn et al. ................. | 439/403 |
| 3,963,296 A | * 6/1976 | Glover et al. ............... | 439/368 |
| 4,405,192 A | * 9/1983 | Eaby et al. .................. | 439/358 |
| 5,129,842 A | * 7/1992 | Margan et al. .............. | 439/532 |
| 5,531,414 A | * 7/1996 | Benedetto et al. .......... | 248/201 |
| 5,697,811 A | * 12/1997 | Pickles et al. .............. | 439/532 |
| 5,764,490 A | * 6/1998 | Barbier et al. ............. | 361/823 |
| 5,893,776 A | * 4/1999 | Black et al. ................ | 439/716 |
| 6,106,329 A | * 8/2000 | Baker, III et al. .......... | 439/532 |

* cited by examiner

Primary Examiner—Tho D. Ta
Assistant Examiner—James R. Harvey
(74) Attorney, Agent, or Firm—Brinks Hofer Gilson & Lione

(57) ABSTRACT

The invention relates to a securing system for different types of plug connector, with different types of first insulating element, which are secured in each case to a base plate, wherein a single type of base plate is provided and the said base plate comprises a stationary holding element and a displaceable holding element, which is displaceable in such a manner that each of the different types of first insulating element can be secured to the base plate.

7 Claims, 3 Drawing Sheets

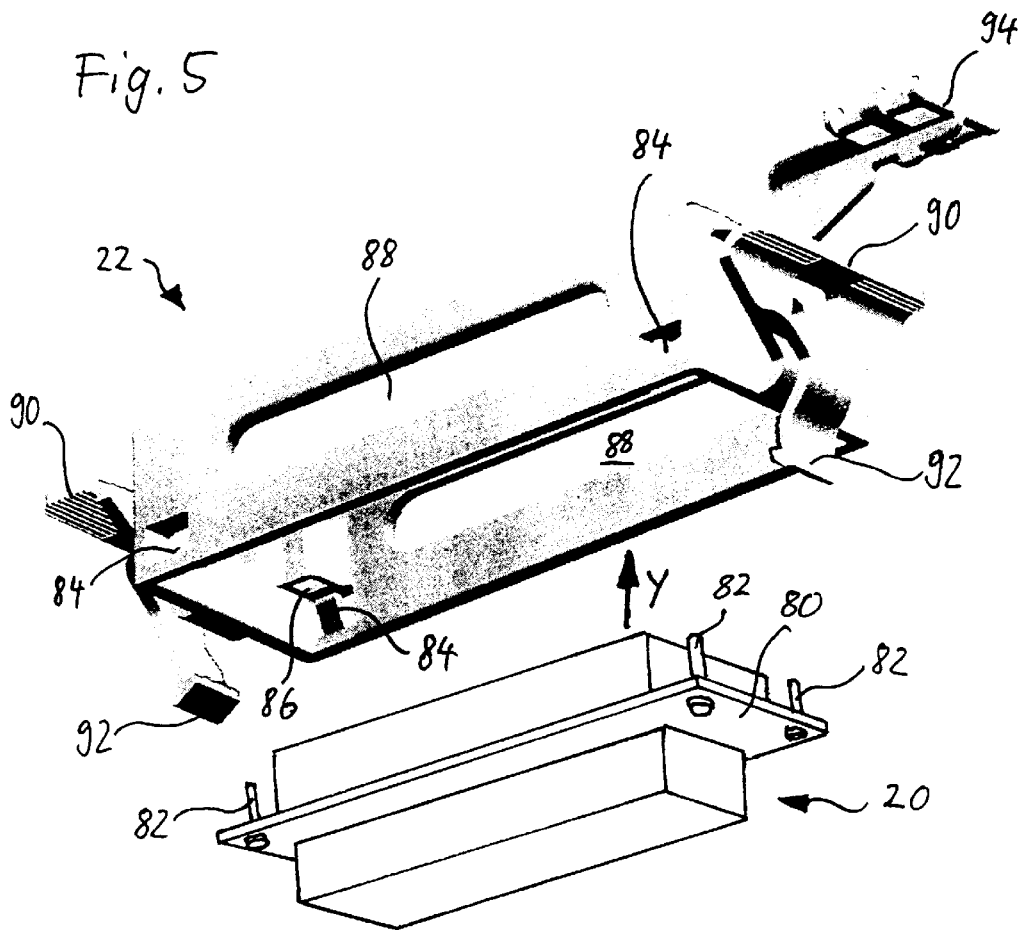
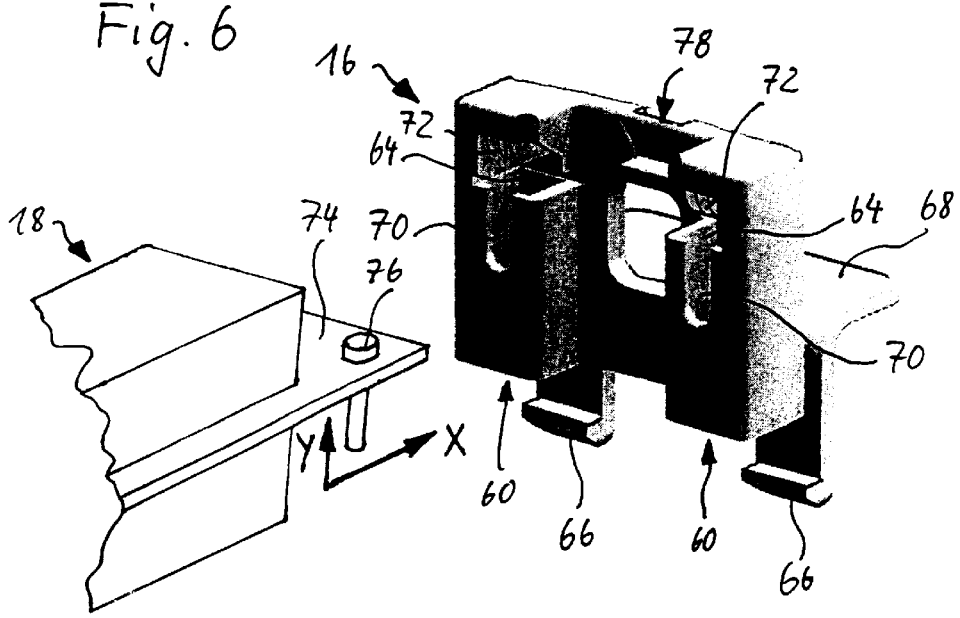

SECURING SYSTEM FOR DIFFERENT TYPES OF PLUG CONNECTOR

FIELD OF THE INVENTION

The invention relates to a securing system for different types of plug connector, with different types of first insulating element, which are secured to base plates.

BACKGROUND OF THE INVENTION

A securing system of this type is used for fitting plug connectors, e.g. in a switchgear cabinet. In this respect, the base plate with the first insulating element is secured to a so-called cap rail, so that a second insulating element can then be fitted into the first insulating element in order to produce an electrical connection. Since the insulating elements usually comprise a plurality of contact pins, high plugging and tensile forces can arise. The securing system must therefore be constructed in a robust and very stable manner. The securing system must nevertheless be easy to install and simple to dismantle for servicing purposes.

In the construction of a switchgear cabinet, many different types of plug connector are to be secured to the cap rail. In this respect, different securing systems have been used to date. It is generally desirable to reduce the manufacturing, assembly and servicing costs. To this end, it is applicable to reduce the material costs for the securing systems. Furthermore, the times for assembly and secondary wiring are to be reduced.

SUMMARY OF THE INVENTION

It is the object of the invention to provide a securing system for different types of plug connector, which can absorb high plugging and tensile forces, whilst at the same time being easy to install and dismantle and having low material costs.

This object is attained according to the invention by a securing system for different types of plug connector, which comprises different types of first insulating element which are secured to base plates, wherein a single type of base plate is provided and said base plate comprises a stationary holding element as well as a displaceable holding element, which can be displaced in such a manner that each of the different types of first insulating element can be secured to the base plate.

As a result of the displaceable holding element, the base plate of the securing system can be adapted to the different types of first insulating element, so that the latter can be secured to a single type of base plate. The number of like base plates is therefore higher and the costs for these like parts is thereby reduced. There is no need to store different types of base plate. Furthermore, the displaceable holding element can be easily handled, so that the base plate can be easily adapted to different types of insulating element. Furthermore, the base plate can be reused in the event of refitting and can be rapidly changed over to a different type of insulating element.

In an advantageous development, the displaceable holding element is constructed as a guided carriage. In this manner, the securing system is particularly robust.

The displaceable holding element is advantageously releasably locked to the base plate. This type of locking connection can be quickly reversed and allows for different securing positions for the different types of insulating element.

In addition, the holding element preferably comprises pegs, to which the first insulating element is releasably secured. As a result of said pegs, the insulating element is held at a distance from the base plate, so that it is easily accessible and sufficient space is available for the cables guided out of said insulating element.

A rectangular first insulating element is particularly advantageously secured by pushing a side element onto each of its end faces, by means of which the insulating element is releasably locked to the holding elements. The side elements, which are only defined on the end faces, require little material and can be constructed as like parts. As a result of the locking with the holding elements, the first insulating element can be easily fitted onto the base plate and dismantled. Assembly and servicing are thereby facilitated. Furthermore, the longitudinal sides of the insulating element are freely accessible at all times.

In a particularly advantageous manner, the side elements are provided with pinch-type brackets, by means of which they are secured to protective conductor plates of the first insulating element. The pinch-type brackets prevent the side elements from falling off the insulating element following dismantling of the insulating element.

A second insulating element is preferably provided, which can be plug-connected to the first insulating element. This second insulating element is secured in a frame with recesses on the longitudinal sides. In contrast to insulating elements which are secured in a housing, improved access to the second insulating element is thereby provided. In particular the recess on the longitudinal sides of the frame allow for unimpeded access to the clamping screws of the insulating element.

The second insulating element advantageously comprises protective conductor plates, by means of which it is releasably locked in the frame. The insulating element is protected in a stable manner with its protective conductor plates in the frame and can nevertheless be rapidly fitted in the frame during assembly.

Furthermore, the frame is preferably releasably locked to the side elements. As a result of this locking, the securing system as a whole is put together in a robust manner, whilst at the same time being easy to dismantle. This ease of dismantling is particularly advantageous with a view toward recycling of the plastics material components.

It is also advantageous if grips with labelling panels are provided for releasing the locking connections. In this manner, it is possible on the one hand to easily release the different locking connections and on the other hand to clearly mark the individual plug connectors, without requiring additional labelling panels to this end, which would incur costs and require additional space.

BRIEF DESCRIPTION OF THE DRAWINGS

A preferred embodiment of the invention is illustrated in the following with the aid of schematic drawings, in which:

FIG. 5 is a perspective bottom view of a frame from FIG. 1 and a second insulating element, and FIG. 6 is a perspective top view of a side element from FIG. 1 and a first insulating element, shown cut away.

Figure 1:
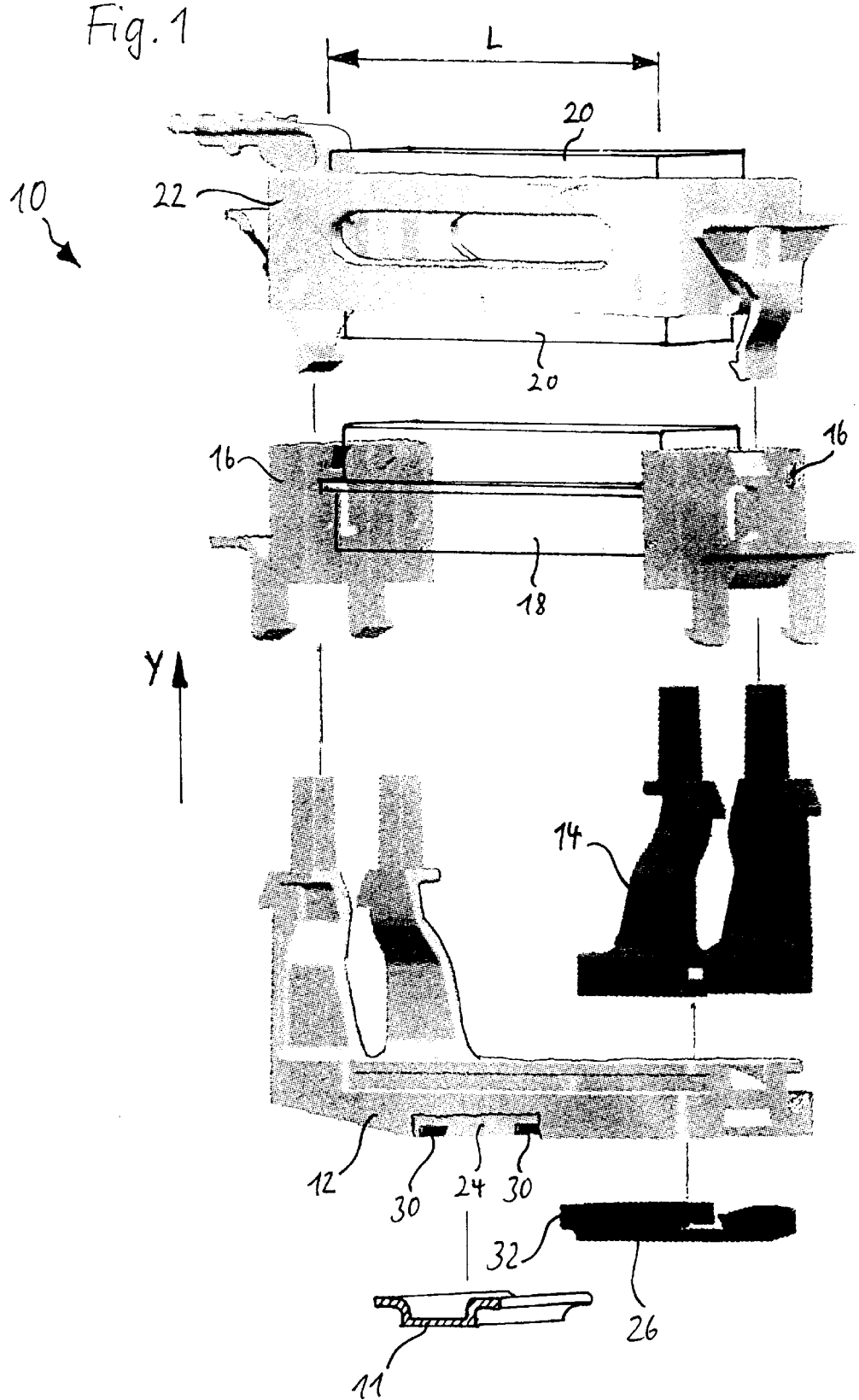
FIG. 1 is an exploded view of a securing system of the invention.
Figure 2:
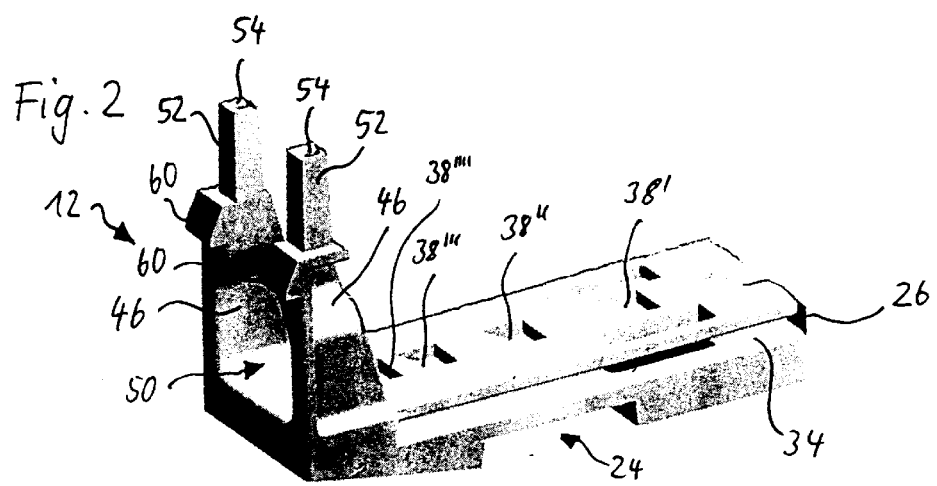
FIG. 2 is a perspective top view of a base plate from FIG. 1.
Figure 3:
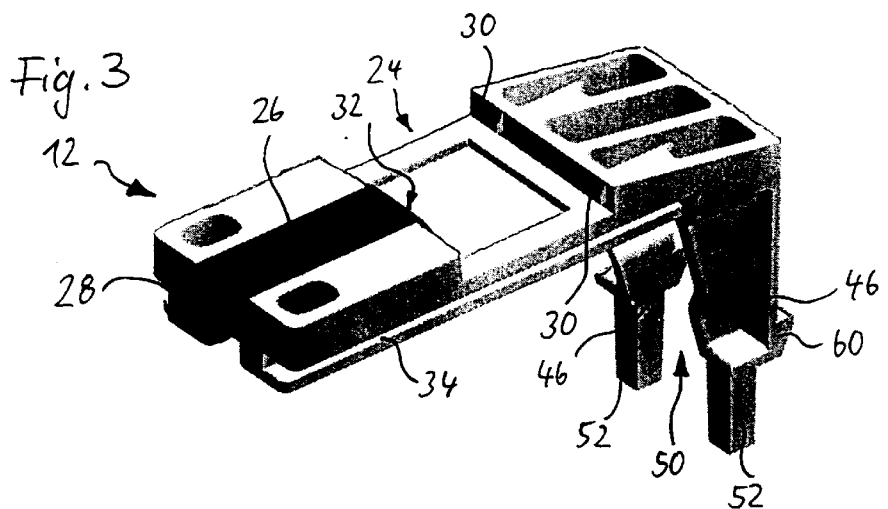
FIG. 3 is a perspective bottom view of the base plate from FIG. 2.
Figure 4:
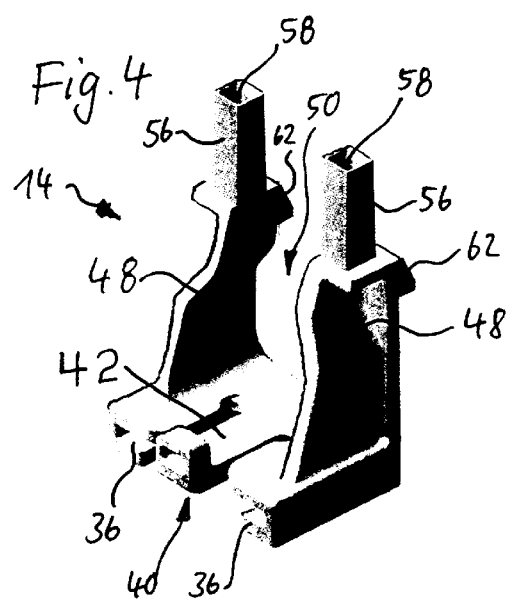
FIG. 4 is a perspective top view of a carriage from FIG. 1.

The securing system 10 is provided for fitting onto a cap rail 11, which can be secured in a switchgear cabinet (not shown). Fitted onto the cap rail 11 is, firstly, a base plate 12, on which a carriage 14 is displaceable. The components cap rail 11, base plate 12 and carriage 14 can be supplied in a pre-assembled state.

A side element 16 is fitted in each case onto the carriage 14 and the base plate 12 in the direction perpendicular to the base surface of the base plate 12. Secured between the side elements 16 is an elongated, substantially cuboid first insulating element 18, into which a second insulating element 20 can be fitted on the opposite side to the base plate 12. The second insulating element 20 is in turn secured in a frame 22. The insulating elements 18 and 20 comprise pins and bushes (not shown), by means of which they form an electrical plug connector.

The securing system 10 comprises different types of first and associated second insulating element, which differ in their number of pins and bushes and to this end have different lengths L. Irrespective of the length L of the first insulating element 18, the side elements 16 can be pushed onto the end face of said first insulating element and then secured to the correspondingly displaced carriage 14 and the base plate 12. In order to accommodate the different types of second insulating element 20, different types of frame 22 are provided, which have different lengths but otherwise have the same construction. As a result of the displaceable carriage 14, the securing system 10 can be adapted to the different frames 22 and can be used for different types of plug connector.

On the side of the base plate 12 opposite the carriage 14, a recess 24 is formed approximately centrally in the transverse direction of the base plate 12 and matches the cap rail 11. Arranged transversely to the recess 24 is a pusher 26 with an injection moulded plastics material spring (not shown), which comprises an opening 28 at the end remote from the base plate 12. A screwdriver, by means of which the pusher 26 can be retracted, can be fitted into the opening 28. Hooks 30 and 32 are constructed on a lateral wall of the recess 24 opposite the pusher 26 and on the end of the pusher 26 facing the recess 24 and engage behind the cap rail 11 and thereby secure the base plate 12 to the cap rail 11.

Constructed on each of the longitudinal sides of -the base plate 12 is a groove 34, in which the carriage 14 is guided and displaceable with a web 36 constructed on its underside. Formed on the upper side of the base plate 12 are cuboid recesses 38', 38'', 38''' and 38''''. A locking cam 40 is resiliently mounted by means of a leaf spring 42 on the underside of the carriage 14 and can be lifted through an opening 44 at the free end of the leaf spring 42 by means of a screwdriver. When the locking cam 40 is raised, the carriage 14 is displaceable in the grooves 34 of the base plate 12. The locking cam 40 locks in one of the recesses 38' to 38'''' and thereby defines set positions for the carriage 14 corresponding to the different lengths L of the different types of plug connector or the associated types of frame 22.

Two pegs 46 project from the rectangular side of the base plate 12 facing the side elements 16 in the corners at one end face of the base plate 12. In the same manner, two pegs 48 project from the carriage 14. Two pegs 46 and 48 in each case form a U-shaped support enclosing a free space 50. A side element 16 can be fitted in each case onto the pegs 46 and 48 with the first insulating element 18 held in-between. The free space 50 is used for guiding out a cable cord (not shown), which is fitted onto the side of the first insulating element 18 facing the base plate 12.

In their free end regions, the pegs 46 comprise slightly conical columns 52 having a square cross section, in which circular cylindrical blind bores 54 are constructed. Similarly, the pegs 48 comprise corresponding columns 56 and blind bores 58. Also constructed on the pegs 46 and 48 are locking cams 60 and 62, which project in the direction of the end faces of the base plate 12.

Two holes 64 having a square cross section are constructed in both corners of the side elements 16 in the direction Y. Furthermore, two locking hooks 66 facing the end face of the base plate 12 are arranged on a spring grip 68 on each of the side elements 16 in the corners. The grip 68 comprises a labelling panel opposite the grip surface.

On the side facing the first insulating element 18, slots 70 parallel to the holes 64 are constructed on the side element 16, and pinch-type brackets 72 are constructed above the slots 70. In this manner, a protective conductor plate 74 constructed on the circumference of the first insulating element 18 in the direction X can be pushed beneath the pinch-type brackets 72 into the side element 16. During this process, screws 76, which are fitted in the direction Y in the protective conductor plate 74, pass through the slots 70 and are held by the pinch-type brackets 72 in the side element 16. Consequently the side element 16 cannot fall from the first insulating element 18.

The first insulating element 18 can be secured with two side elements 16 fitted onto its end faces onto the pegs 46 and 48. In this respect, the holes 64 are pushed onto the columns 52 and 56, the screws 76 being positioned in the blind bores 54 and 58. The locking hooks 66 engage behind the locking cams 60 and 62 and thereby secure the side elements 16 on the base plate 12 and on the carriage 14.

The second insulating element 20 in the frame 22 can be fitted onto the first insulating element 18 secured in this manner. To this end, each side element 16 comprises, on its side remote from the end faces of the first insulating element 18, a locking cam 78. Like the first insulating element 18, the second insulating element 20 has a protective conductor plate 80, in whose corners screws 82 are fitted. The protective conductor plate 80 can be inserted into the frame 22 and thereby held by locking springs 84, which are constructed in each corner of the frame 22. The protective conductor plate 80 comes to rest behind the locking springs 84 in each case against an abutment with blind bores 86. In this respect, the screws 82 enter the blind bores 86 and are positioned therein.

Constructed on each of the longitudinal sides of the frame 22 is a recess 88, which allows access to clamping screws (not shown) in the second insulating element 20 for the connection of a cable cord (not shown).

Also constructed on each of the end faces of the frame 22 is a projecting grip 90 with a labelling panel, on which a locking hook 92 is integrally formed, which can be displaced by the projecting grip 90. The two locking hooks 92 lock in the fitted state of the frame 22 (and of the second insulating element 20) onto the side elements 16 (or the first insulating element 18) with the locking cams 78 thereof and thereby hold the two insulating elements together.

Via a tension release constructed on an end face of the frame 22, the cable cord of the second insulating element 20 is guided out and is secured to the side of the second insulating element 20 remote from the base plate 12.

In the case of insulating elements having a large number of pins and bushes, it is possible to additionally screw the insulating elements 18 and 20 into the blind bores 54 or 58 and 86 by means of the screws 76 and 82.

We claim:

1. A securing system for different types of plug connectors, comprising:
   a base plate, having a given length, adapted to have the different types of plug connectors secured thereto;
   a first insulating element of a length less than said given length;
   said base plate comprising a stationary holding element that is stationary relative to said base plate;
   said base plate further comprising a displaceable holding element which is displaceable relative to said base plate to accommodate first insulating elements of various lengths less than said given length and allowing the plug connector to be secured to said base plate;
   side elements attached to the end faces of the first insulating element that function to releasably lock the first insulating elements to said holding elements;
   a second insulating element adapted to be plug-connected to said first insulating element;
   a frame, comprising longitudinal sides having recesses formed therein, that functions to carry the second insulating element, said frame comprising locking connections that function to releasably lock it to said side elements;
   said stationary holding element and said displaceable holding element each having at least two pegs to which said first insulating element cart be releasably secured; and
   said at least two pegs on said stationary and displaceable holding elements being disposed apart from each other to enclose a free space between each other.

2. A securing system for different types of plug connectors, as claimed in claim 1, wherein the invention farther comprises:
   said displaceable holding element is a guided carriage.

3. A securing system for different types of plug connectors, as claimed in claim 1, wherein the invention further comprises:
   said displaceable holding element includes locking means by which it can be releasably locked to the base plate.

4. A securing system for different types of plug connectors, as claimed in claim 1, wherein the invention further comprises:
   said first insulating element is rectangular and has end faces; and
   side elements attached to the end faces of the first insulating element that function to releasably lock the first insulating elements to said holding elements.

5. A securing system for different types of plug connectors, as claimed in claim 4, wherein the invention further comprises:
   said first insulating element comprising a protective conductor plate; and
   said side elements comprise pinch-type brackets that are adapted to be secured to said protective conductor plate of the first insulating element.

6. A securing system for different types of plug connectors, as claimed in claim 1, wherein the invention further comprises:
   said second insulating element comprises a protective conductor plate that functions to releasably lock said second insulating element in the frame.

7. A securing system for different types of plug connectors, as claimed in claim 1, wherein the invention further comprises:
   said frame comprising grips with labeling panels that function to release the locking connections.

* * * * *

UNITED STATES PATENT AND TRADEMARK OFFICE
CERTIFICATE OF CORRECTION

PATENT NO. : 6,354,888 B1
APPLICATION NO. : 09/570255
DATED : March 12, 2002
INVENTOR(S) : Markus Cech et al.

It is certified that error appears in the above-identified patent and that said Letters Patent is hereby corrected as shown below:

On the Title Page

Item (73), Assignee delete "Gerag AG (DE)", and substitute --Contact GmbH Elektrische Bauelemente-- in its place.

Signed and Sealed this

Nineteenth Day of December, 2006

JON W. DUDAS
*Director of the United States Patent and Trademark Office*